June 4, 1957         W. F. FOWLER, JR., ET AL         2,794,742
PHOTOGRAPHIC ELEMENTS AND THEIR PREPARATION
Filed Aug. 3, 1955

*Fig. 1*

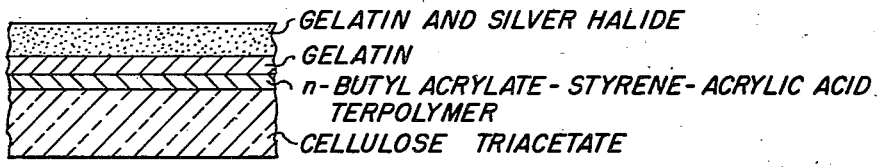

- GELATIN AND SILVER HALIDE
- GELATIN
- n-BUTYL ACRYLATE - STYRENE - ACRYLIC ACID TERPOLYMER
- CELLULOSE TRIACETATE

*Fig. 2*

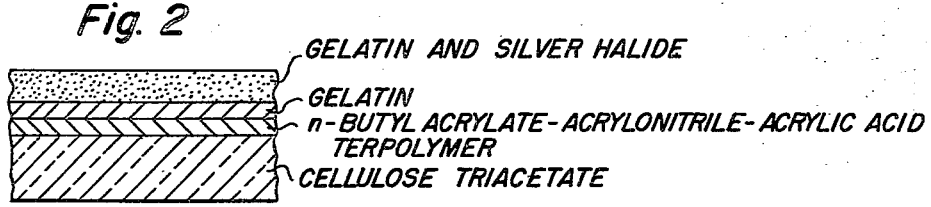

- GELATIN AND SILVER HALIDE
- GELATIN
- n-BUTYL ACRYLATE - ACRYLONITRILE - ACRYLIC ACID TERPOLYMER
- CELLULOSE TRIACETATE

*Fig. 3*

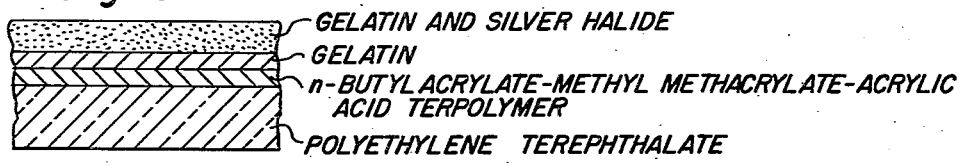

- GELATIN AND SILVER HALIDE
- GELATIN
- n-BUTYL ACRYLATE - METHYL METHACRYLATE - ACRYLIC ACID TERPOLYMER
- POLYETHYLENE TEREPHTHALATE

WILLIAM F. FOWLER JR.
JOHN A. CATHCART
INVENTORS

BY
ATTORNEYS

2,794,742

PHOTOGRAPHIC ELEMENTS AND THEIR PREPARATION

William F. Fowler, Jr., and John A. Cathcart, Rochester, N. Y., assignors to Eastman Kodak Company, Rochester, N. Y., a corporation of New Jersey Application August 3, 1955, Serial No. 526,095

11 Claims. (Cl. 96—87)

This invention relates to photographic film elements, and is particularly concerned with transparent photographic film elements having an improved anchoring substratum (commonly known as a subbing layer) between the film base and the water-permeable colloid layer or layers disposed thereon.

It is common practice in the manufacture of photographic films to apply a thin layer of gelatin from a dispersion in a solvent for the film base before the light-sensitive silver halide emulsion layer is applied. This subbing layer is usually necessary in order to achieve adequate adhesion between the emulsion layer and the film base. Ordinarily, it is necessary that the solvent employed be a solvent for the base in order to achieve adequate adhesion. The use of solvents is often a disadvantage since they tend to cause curl or surface crazing of the film base. Furthermore, the problem of solvent removal and recovery is an objectionable feature in commercial practice. Furthermore, many of the synthetic resins which have utility as film base materials, such as the terephthalate polyesters, have very poor solubility in most common organic solvents, and hence it is necessary to use phenol or a cresol as solvent for the gelatin to obtain any adhesion of the subbing layer. In the case of more tractable hydrophobic film base materials, such as the cellulose esters, it is often necessary to coat the base with a thin resin layer in order to achieve adequate water resistance before application of the emulsion layer. Such resin layers usually necessitate the use of solvents also with the accompanying disadvantages thereof.

It is therefore an object of this invention to provide new and improved photographic film elements, and particularly photographic film elements having improved anchoring or subbing layers.

It is a further object of the invention to provide anchoring or subbing materials which have excellent adhesion to hydrophobic film base materials, including polyesters, polystyrene, cellulose triacetate, polyamides, and the like, whether applied in aqueous medium or in solvent medium.

Another object of the invention is to provide photographic elements with improved dimensional stability and anchorage between the film base and water-permeable colloid layers disposed thereon, and in which the anchoring material has exceptional stability on exposure to heat or ultraviolet radiation.

Another object of the invention is to provide subbing materials which can be applied to film base before stretching of the film base and which form continuous coatings of high tenacity after stretching of the base.

Other objects will be apparent from the drawings and from the description and claims which follow.

These and other objects of the invention are attained by means of this invention wherein a photographic support including paper and film base of hydrophobic material, e. g., a hydrophobic cellulose carboxylic acid ester including cellulose acetate, cellulose acetate butyrate, cellulose nitrate; a super polymer such as a super polyamide, a highly polymeric linear ester of a dicarboxylic acid and a dihydric alcohol; polyvinyl chloride; polystyrene; etc., is coated with a ternary copolymer of an alkyl acrylate, acrylic or methacrylic acid, and styrene, acrylonitrile or methyl methacrylate. The resulting layer, which can be applied from either solvent or aqueous dispersion, after drying has excellent adherence to the film base and also to water-permeable colloid layers disposed thereon, e. g. gelatin silver halide emulsion layers, gelatin filter layers, or antihalation layers containing a water-permeable colloid binding agent. The adhesion thereby obtained is usually good even when the terpolymer is deposited from an aqueous emulsion whereby the problems inherent in solvent dispersions are obviated. Furthermore, the terpolymers form excellent anchoring layers with such synthetic polymeric materials as polystyrene, polyesters such as highly polymeric linear esters of the glycols with such acids as terephthalic acid, 4,4'-dicarboxy diphenyl sulfone and the like and other well known synthetic hydrophobic film base materials. The subbing of such synthetic hydrophobic film base materials which are highly insoluble has presented a difficult problem to the art. One of the few known methods of subbing such materials is that disclosed in Swindells U. S. Patent 2,698,235, wherein vinylidene chloride copolymers are employed. The subbing materials embodying this invention possess the advantages possessed by such materials but in addition are more stable on exposure to heat or ultraviolet radiation.

The terpolymers useful in practicing the invention are those lying within a relatively limited range of relative proportions. Thus the terpolymers of the invention are those composed of about 48–70% of an alkyl acrylate wherein the alkyl group contains 2–10 carbon atoms, about 30–48% of either styrene, acrylonitrile or methyl methacrylate, and about 4–12% of acrylic or methacrylic acid, all percentages being by weight. The preferred compositions embodying the invention are the terpolymers of (1) 48–67.2% of alkyl acrylate, 32.8–48% of styrene, and 4–12% of acrylic acid;
(2) 48–70% of alkyl acrylate, 30–48% of acrylonitrile, and about 4% of acrylic acid; and
(3) 48–60% of alkyl acrylate, 40–48% methyl methacrylate and 4–8% acrylic acid.

The alkyl acrylate serves as a flexibilizing component and gives unduly soft and weak subbing layers when employed in amounts greater than defined hereinabove. Similarly, the styrene, acrylonitrile or methyl methacrylate acts as a hardening component, and the subbing layer is too brittle, tends to flake off, and exhibits low adhesion to the gelatin silver halide layer when the concentration of such component is too high. The amount of unsaturated acid is also rather critical since if it is lower than about 4% of the terpolymer weight, the adhesion of gelatin layers to the terpolymer is poor, whereas if the concentration of unsaturated acid is above about 12% of the terpolymer weight, the hydrosols are difficult to prepare and stabilize properly. Best results are obtained with partial neutralization of the carboxyl groups of the resin.

The alkyl acrylates which are suitably employed include such materials as ethyl acrylate, n-propyl acrylate, isobutyl acrylate, n-amyl acrylate, n-hexyl acrylate, 2-ethylhexyl acrylate, and n-octyl acrylate. The preferred alkyl acrylate for use in practicing the invention is n-butyl acrylate which gives an unusually useful subbing material. When n-butyl acrylate is employed with styrene and acrylic acid, the concentration of acrylate is usually within the range of 48–67.2% and preferably 52.8–62.4%, the styrene desirably amounts to 32.8–48% and preferably 37.6–47.2%, and the acrylic acid desirably amounts to 4–12% and preferably 4–8% of the terpolymer weight. With acrylonitrile and acrylic acid, the n-butyl acrylate is desirably equal to or greater than 48%, the acrylonitrile is desirably equal to or less than 48%, and the acrylic acid is desirably present in about 4% of the terpolymer weight. With methyl methacrylate and acrylic acid, the n-butyl acrylate preferably amounts to about 57.6%, the methyl methacrylate about 42.4%, and the acrylic acid about 4% of the terpolymer weight.

The terpolymers embodying the invention can be prepared by copolymerizing the appropriate monomers by any of the well known polymerization methods. For example, the polymerization can be carried out in aqueous dispersion containing a polymerization catalyst such as a peroxide, persulfate, or other peroxy compound, with or without an activator such as ammonium persulfate or sodium metabisulfite, and an emulsifying or dispersing agent. If desired, the terpolymers can also be prepared by polymerizing in bulk or by polymerization in a suitable organic solvent. The polymerization techniques ordinarily applied in the preparation of most ethylenic polymers are applicable in preparing the present terpolymers, whether in hydrosol form or otherwise, and will not be described herein.

The terpolymers embodying the invention can be coated on the hydrophobic film base by any suitable technique from either organic solvent solution or from aqueous dispersion. Thus, the terpolymer layer as well as the subsequent gelatin sublayer if one is employed, can be deposited by any of the conventional methods used in the manufacture of photographic elements, such as by immersion of the film base into a solution of the coating material, by spraying or by coating from a hopper provided with a doctor blade, or similar well known means. The thickness of the layer can vary over a very wide range, such as from 0.01 mil to 0.1 or greater. Generally, anchoring layers of from .01 mil to .05 mil are most satisfactory.

It is often desirable to deposit a gelatin layer onto the terpolymer layer before application of the gelatin silver halide layer thereon. If the film base material is stretched or otherwise oriented before use, the subbing layer can be applied either before or after such stretching. Best results are obtained by application of the subbing layer before or during the stretching and before the heat setting which is often employed.

The subbings embodying the invention find utility in coating cellulose ester film bases, such as the well known triacetate film base as well as in subbing the terephthalate polyesters, polystyrene, sulfone polyesters, polyamides such as nylon, and similar hydrophobic film bases.

Representative photographic film elements described in the following examples are shown in the drawings, of which:

Fig. 1 is a cross sectional view of the photographic film of Example 1,

Fig. 2 is a cross sectional view of the photographic film of Example 3, and

Fig. 3 is a cross sectional view of the photographic film of Example 7.

The invention is best understood with reference to certain preferred embodiments as described in the following examples, it being understood that the examples are included for purposes of illustration and not to limit the scope of the invention unless otherwise specifically indicated.

*Example 1*

A solution of 2.5 g. of sodium lauryl sulfate in 800 ml. of distilled water was heated to 80° C. in a flask equipped with a mechanical stirrer, two dropping funnels, and a thermometer set to measure liquid temperature. Thereafter, 1.27 g. of potassium persulfate was added. To this solution was added simultaneously, dropwise with stirring, over a 30-minute period, the contents of the two dropping funnels. The first funnel contained the monomeric mixture consisting of 20 g. of acrylic acid, 140 g. of n-butyl acrylate, and 94 g. of styrene. The second funnel contained 2.5 g. of sodium lauryl sulfate in 200 ml. of distilled water. The polymerization mixture was maintained at 80–82° C. during the monomer addition and for 15 minutes thereafter. It was then cooled to room temperature and filtered to give a translucent hydrosol containing only a trace of coagulum and having a pH of 2.9. The hydrosol was adjusted to a pH of 6 with dilute ammonium hydroxide solution and filtered through a double layer of cheesecloth to remove the small amount of coagulum. A dispersion of this terpolymer hydrosol containing 20% solids was applied to cellulose triacetate film base by means of an extrusion hopper. The coating, which appeared as a milky continuously layer, was dried by passage through an impingement drier with an air temperature of 180–190° F. For final curing, the film temperature was raised to 220–230° F. by means of infrared heat. A dilute dispersion of gelatin was applied over the terpolymer layer and the coating cured at 180–190° F. The film was then coated with a photographic emulsion (gelatino silver halide) and dried. The dry adhesion between the layers was good.

*Example 2*

A terpolymer of 10 g. of acrylic acid, 134 g. of n-butyl acrylate, and 110 g. of styrene was prepared in accordance with the process of Example 1. Cellulose acetate film base was coated with a layer of this terpolymer and with the gelatin and gelatin silver halide layers in the same manner as described in the preceding example. The dry adhesion between the layers was slightly less than that of the terpolymer described in Example 1.

*Example 3*

A terpolymer hydrosol of 10 g. of acrylic acid, 73 g. of acrylonitrile, and 151 g. of n-butyl acrylate was prepared by the procedure described in Example 1. Cellulose triacetate film support was coated with a layer of this terpolymer and with the subsequent layers as described. The resulting photographic film had good adhesion between the various layers.

*Example 4*

A terpolymer hydrosol was prepared by polymerizing 10 g. of acrylic acid, 146 g. of n-butyl acrylate, and 98 g. of methyl methacrylate according to the process described in Example 1. Cellulose triacetate film support was coated with a subbing layer of this terpolymer and with the subsequent gelatin and gelatin silver halide layers as described in Example 1. The resulting photographic film showed good dry adhesion between the various layers.

*Example 5*

As has been described, the terpolymer subbings of the invention are of particular utility with synthetic hydrophobic polymer film bases. Thus, a strip of polystyrene film base having a thickness of 5 mils was drawn through a dispersion of the terpolymer described in Example 1, allowed to drain and cured at 80° C. for 10 minutes. It was then coated with a dilute gelatin dispersion, again cured, and coated with a light-sensitive photographic emulsion. The dry adhesion between all layers was excellent.

*Example 6*

A strip of an unstretched sheet of a copolyester of 2,2-dimethyl propanediol, isophthalic acid, and 4,4' dicarboxy diphenyl sulfone was drawn through the terpolymer dispersion described in Example 3, allowed to drain and cured at 100° C. for 10 minutes. It was then coated with a dilute gelatin dispersion, again cured and coated with a photographic emulsion. The dry adhesion between all layers was good. Similar results are obtained when the terpolymer layer is applied to the polyester film before stretching, the film stretched in the usual manner, and the gelatin and photographic emulsions applied thereto.

*Example 7*

A strip of an unstretched sheet of the polyester of ethylene glycol and terephthalic acid was drawn through the dispersion described in Example 4, allowed to drain and cured at 100° C. for 10 minutes. The dry adhesion of this substratum to the base was excellent. The coated base could thereafter be oriented in the usual manner and the gelatin silver halide emulsion applied thereto, with or without an intermediate gelatin layer to give a high strength photographic film with excellent adhesion between the various layers.

*Example 8*

A strip of an unstretched sheet of a polyester of 1,5-pentanediol, succinic acid, and 4,4'-dicarboxy diphenyl sulfone was drawn through the dispersion described in Example 2, allowed to drain, and cured at 100° C. for 10 minutes. The dry adhesion of this substratum to the film base was excellent.

*Example 9*

Although the adhesion is lowered somewhat thereby, the terpolymer can be applied to polyester film bases which have been stretched and heat stabilized if desired. Thus a strip of stretched and heat stabilized film of the kind used in the preceding example was drawn through the dispersion described in Example 1, allowed to drain and cured at 100° C. for 10 minutes. It was then coated with a dilute gelatin dispersion, again cured and coated with a light-sensitive photographic emulsion. The dry adhesion between all layers was fairly good.

*Example 10*

An n-butyl acrylate, styrene, acrylic acid terpolymer hydrosol was prepared by the emulsion copolymerization of 55% n-butyl acrylate, 37% styrene, and 8% acrylic acid. This polymerization was carried out so that the latex formed contained 20% by weight of terpolymer and 2% by weight of surfactant. An amount of saponin equal to the weight of surfactant was added to the latex after polymerization. This latex was applied from a hopper to uniaxially oriented ethylene glycol-terephthalic acid polyester film support and dried with an air stream at 120° F. The resulting coated film base was then oriented in a direction perpendicular to the original orientation but in the same plane. The biaxially oriented film base was then heat set at 310-315° F. for 11 minutes to a weight density of 1.376 g. per cc. The resulting fully processed film base thereafter had a layer of gelatin solution applied thereto from a hopper. The gelatin solution consisted of 0.5% gelatin, 0.05% acetic acid, 0.025% saponin, 0.5% chromic chloride, and sufficient water to make 100%. The gelatin layer was dried by an air stream at 120° F. with substantially no further curing. The resulting subbed film base was coated with a light-sensitive photographic emulsion. The adhesion of the emulsion to the film base was very good. The use of chromic chloride is of advantage in preventing slipping or skidding of the emulsion layer.

Similar results are attained employing the terpolymers as coatings on photographic paper or other support materials upon which photosensitive layers are thereafter deposited.

In preparing the terpolymers employed in practicing the invention, any of the various surfactants can be employed with equally good results. Typical surfactants which can be employed instead of the sodium lauryl sulfate include the sodium alkyl aryl sulfonates, sodium laurate, sodium myristate, mixtures of sodium alkyl aryl sulfonates with wetting agents of the saponin type, ampholytic substances such as long-chain betaines, and similar well known dispersing agents. Although styrene, acrylonitrile, or methyl methacrylate is desirably employed as the hardening monomer, the nuclearly methylated styrenes, halogenated styrenes, methacrylonitrile, and similar hydrophobic monomers can be employed. Acrylic acid is preferably employed as the hydrophilic monomer, but methacrylic acid can be used alternatively.

Although the terpolymers are desirably employed in the form of aqueous dispersions or hydrosols obtained directly from polymerization, the terpolymers can be isolated from the polymerization reaction medium and dissolved in suitable organic solvents for application if desired. The invention is not limited to any particular light-sensitive photographic emulsion, and the emulsions employed can be those which are commonly employed in either black-and-white or color photography. The nature of the emulsion is not critical, and the light-sensitive layer may consist of simple or mixed silver halides dispersed in various types of water-permeable binding agents. Thus, the emulsion coatings may contain silver chloride, silver bromide, silver chlorobromide, or silver iodobromide in gelatin or equivalent water-permeable natural or synthetic colloids. Although aqueous dispersions provide entirely satisfactory adhesions, solvent solutions of the terpolymer can be used, and the solvent is desirably a volatile solvent which has some solubilizing effect on the film base so as to increase the adhesion. Suitable solvents include acetone, methyl isobutyl ketone, butyl acetate, and the like. The terpolymer layers described herein can be used directly for anchoring emulsion or other layers or can be used in conjunction with other layers such as gelatin, water-sensitive cellulose esters, waterproofing layers, antihalation layers, and filtering layers. If desired, such terpolymers can be used as antihalation layers by incorporation of the usual removable or bleachable dyes therein.

Thus the invention is useful in making many of the well known photographic film elements for use in any field of photography. The terpolymers are of particular importance with the synthetic polymer film base materials which are difficult to sub and which are desirably employed in such applications as graphic arts because of their good dimensional stability. The terpolymer also imparts a degree of water resistance when employed on water-permeable or hydrophilic film base materials.

Although the invention has been described in detail with particular reference to certain preferred embodiments thereof, variations and modifications can be effected within the spirit and scope of the invention as illustrated in the drawings and described hereinabove, and as defined in the appended claims.

We claim:

1. A photographic element comprising a hydrophobic film base having on at least one surface a layer of a terpolymer of about 48-70 parts by weight of an alkyl acrylate wherein the alkyl group contains 2-10 carbon atoms, about 30-48 parts by weight of a member of the group consisting of styrene, acrylonitrile and methyl methacrylate, and about 4-12 parts by weight of an unsaturated acid from the group consisting of acrylic acid and methacrylic acid, and having a gelatin silver halide layer adjacent said layer of terpolymer.

2. A photographic element comprising a hydrophobic film base having on at least one surface a layer of a terpolymer of 48-67.2 parts by weight of n-butyl acrylate, 32.8-48 parts by weight of styrene, and 4-12 parts by weight of acrylic acid, having a layer of gelatin on a said layer of terpolymer and having a gelatin silver halide layer on said gelatin layer.

3. A photographic element comprising a hydrophobic film base having on at least one surface a layer of a terpolmer of 48-70 parts by weight of n-butyl acrylate, 30-48 parts by weight of acrylonitrile and about 4 parts by weight of acrylic acid, having a layer of gelatin on a said layer of terpolymer and having a gelatin silver halide layer on said gelatin layer.

4. A photographic element comprising a hydrophobic film base having on at least one surface a layer of a terpolmer of 48-60 parts by weight of n-butyl acrylate, 40-48 parts by weight methyl methacrylate and 4-8 parts by weight acrylic acid, having a layer of gelatin on a said layer of terpolymer and having a gelatin silver halide layer on said gelatin layer.

5. A photographic element comprising a cellulose carboxylic acid ester film base having on at least one surface a layer of a terpolymer of about 48-70 parts by weight of an alkyl acrylate wherein the alkyl group contains 2-10 carbon atoms, about 30-48 parts by weight of a member of the group consisting of styrene, acrylonitrile and methyl methacrylate and about 4-12 parts by weight of an unsaturated acid from the group consisting of acrylic acid and methacrylic acid having a gelatin layer on a said layer of terpolymer and having a gelatin silver halide layer on said gelatin layer.

6. A photographic element comprising a polyethylene terephthalate film base having on at least one surface a layer of a terpolymer of about 48-70 parts by weight of an alkyl acrylate wherein the alkyl group contains 2-10 carbon atoms, about 30-48 parts by weight of a member of the group consisting of styrene, acrylonitrile and methyl methacrylate and about 4-12 parts by weight of an unsaturated acid from the group consisting of acrylic acid and methacrylic acid, having a gelatin layer on a said layer of terpolymer and having a gelatin silver halide layer on said gelatin layer.

7. A photographic element comprising a highly polymeric oriented film base of an ester of a dicarboxylic acid and a dihydric alcohol having on at least one surface a layer of a terpolymer of about 48-70 parts by weight of an alkyl acrylate wherein the alkyl group contain 2-10 carbon atoms, about 30-48 parts by weight of a member of the group consisting of styrene, acrylonitrile and methyl methacrylate and about 4-12 parts by weight of an unsaturated acid from the group consisting of acrylic acid and methacrylic acid, having a gelatin layer on a said layer of terpolymer and having a gelatin silver halide layer on said gelatin layer.

8. A photographic element comprising a cellulose triacetate having on at least one surface a layer of a terpolymer of about 48-70 parts by weight of an alkyl acrylate wherein the alkyl group contains 2-10 carbon atoms, about 30-48 parts by weight of a member of the group consisting of styrene, acrylonitrile and methyl methacrylate and about 4-12 parts by weight of an unsaturated acid from the group consisting of acrylic acid and methacrylic acid, having a gelatin layer on a said layer of terpolymer and having a gelatin silver halide layer on said gelatin layer.

9. The method which comprises applying to at least one surface of a hydrophobic film support an aqueous emulsion of a terpolymer of about 48-70 parts by weight of an alkyl acrylate wherein the alkyl group contains 2-10 carbon atoms, about 30-48 parts by weight of a member of the group consisting of styrene, acrylonitrile and methyl methacrylate and about 4-12 parts by weight of an unsaturated acid from the group consisting of acrylic acid and methacrylic acid drying the resulting layer of emulsion, applying thereover an aqueous gelatin layer, drying said gelatin layer, and applying a gelatin silver halide emulsion over the dried gelatin layer.

10. The method which comprises applying to at least one surface of an unstretched highly polymeric hydrophobic film base an aqueous emulsion of a terpolymer of about 48-70 parts by weight of an alkyl acrylate wherein the alkyl group contains 2-10 carbon atoms, about 30-48 parts by weight of a member of the group consisting of styrene, acrylonitrile and methyl methacrylate and about 4-12 parts by weight of an unsaturated acid from the group consisting of acrylic acid and methacrylic acid, drying the resulting coated film base, stretching the dried coated film base in at least one direction, applying an aqueous gelatin layer on the terpolymer layer after said stretching, drying said gelatin layer, and applying a gelatin silver halide emulsion over the dried gelatin layer.

11. The method which comprises providing an unoriented sheet of highly polymeric linear ester of ethylene glycol and terephthalic acid having a melting point about 200° C., applying to at least one surface thereof an aqueous emulsion of a terpolymer of about 48-70 parts by weight of an alkyl acrylate wherein the alkyl group contains 2-10 carbon atoms, about 30-48 parts by weight of a member of the group consisting of styrene, acrylonitrile and methyl methacrylate and about 4-12 parts by weight of an unsaturated acid from the group consisting of acrylic acid and methacrylic acid, drying said terpolymer layer to a continuous film, stretching the resulting laminate to orient said polymeric ester, applying an aqueous gelatin layer on the terpolymer layer, drying said aqueous gelatin layer, and applying a layer of an aqueous gelatin silver halide emulsion on the dried gelatin layer.

References Cited in the file of this patent

UNITED STATES PATENTS

| | | |
|---|---|---|
| 2,604,464 | Segall et al. | July 22, 1952 |
| 2,698,240 | Alles et al. | Dec. 28, 1954 |